United States Patent
Inayoshi

[11] Patent Number: 5,983,935
[45] Date of Patent: Nov. 16, 1999

[54] LP GAS CONTAINER VALVE AGAINST DISASTERS

[75] Inventor: Tamiaki Inayoshi, Okazaki, Japan

[73] Assignee: Aichi Koatsu Co., Ltd., Okazaki, Japan

[21] Appl. No.: 08/650,451

[22] Filed: May 20, 1996

[30] Foreign Application Priority Data

Dec. 22, 1995 [JP] Japan ................................. 7-350365

[51] Int. Cl.⁶ ............................................. F16K 15/00
[52] U.S. Cl. .................................. 137/614.2; 137/519.5; 137/460
[58] Field of Search ........................... 137/614.2, 519.5, 137/460

[56] References Cited

U.S. PATENT DOCUMENTS

| | | | |
|---|---|---|---|
| 3,247,862 | 4/1966 | Burke | 137/614.2 |
| 3,709,255 | 1/1973 | Ciotti . | |
| 3,941,145 | 3/1976 | Morain et al. | 137/460 |
| 4,026,284 | 5/1977 | Boehringer | 137/614.2 |
| 4,635,680 | 1/1987 | Fang | 137/614.2 |
| 4,649,952 | 3/1987 | Jobe | 137/614.2 |
| 5,232,019 | 8/1993 | Wolff et al. | 137/614.2 |

FOREIGN PATENT DOCUMENTS

| | | | |
|---|---|---|---|
| 0 394 673 | 10/1990 | European Pat. Off. . | |
| 55767 | 5/1981 | Japan | 137/460 |
| 55769 | 5/1981 | Japan | 137/460 |
| 8201475 | 9/1982 | Netherlands | 137/460 |
| 54411 | 3/1899 | United Kingdom | 137/460 |

*Primary Examiner*—A. Michael Chambers
*Attorney, Agent, or Firm*—Venable; Robert J. Frank; Julie A. Petruzzelli

[57] ABSTRACT

An LP gas container valve to be mounted on a propane gas container is provided for preventing a fire, explosion or other accident at the time of a disaster. The LP gas container valve comprises a valve body having a valve outlet and a gas passage leading from an inlet connection to a propane gas container to the valve outlet, a closing valve (attached to the valve body) for opening and closing the gas passage, a safety valve (attached to the valve body) actuated in response to an excessive elevation in gas pressure, a branching point in the gas passage leading to the safety valve, and a ball located in the gas passage between the branching point and the closing valve. The ball is movable between its stationary position in normal operation and its gas cutting off position in response to an excessive elevation in gas pressure, both of which are located between the closing valve and the branching point in the gas passage. The LP gas container also includes a tapered portion of the gas passage in the vicinity of the gas cutting off position of the ball to narrow the gas passage adjacent to the closing valve. At the time of an excessive outflow of gas from the gas container toward the valve outlet, the ball abuts against the tapered portion to close the gas passage.

11 Claims, 4 Drawing Sheets

LP GAS CONTAINER VALVE AGAINST DISASTERS

BACKGROUND OF THE INVENTION

1. Field Of The Invention

The present invention relates to gas container valves. More particularly, it relates to an LP gas container valve capable of meeting disasters by preventing an abnormal outflow of gas due to a disaster from occurring when the container valve is fully opened in its state of normal use.

2. Description Of The Related Art

A property required of valves to be mounted on an inlet/outlet of a container for a high-pressure gas, such as an LP gas container, is the capability of satisfactorily carrying out such typical operations as the charging of gas, the recovery of residual gas and the gas blow test. In addition, as a countermeasure against such disasters as an earthquake or fire, other requirements include prevention of a secondary disaster resulting from the discharge of a large amount of gas due to a collapsed house or damage to the gas supplying facility and prevention of a gas discharge at the time a gas cylinder falls down so that an explosion of the cylinder does not occur even if the container is exposed to a flame in a fire. However, the technology completely satisfying these requirements has not yet been developed.

Of those described above, while a safety valve has been provided to prevent an explosion of the container due to an abnormally elevated pressure within the container, such a valve is incapable of preventing the discharge of a large amount of gas due to damage of the gas supplying facility.

As a countermeasure against the danger of fire, explosion, etc., there are safety valves which incorporate a cut-off valve to be actuated as a result of sensing an abnormal outflow of gas between the valve and the destination of the gas supply or a sensor mechanism for sensing an inclination of the gas container or the shaking of an earthquake and a gas cutting off section to be actuated by the sensor.

Generally, in the case where an LP gas cylinder or the like is provided at a consumer's house, a high-pressure collective automatic switching device is used and all of the individual container valves are fully opened. Accordingly, if a breakage occurs at some point in the gas supply due to an earthquake or an unexpected accident, it is very dangerous because a large amount of gas is discharged at the point of breakage. In such a case, the gas supply beyond the valve must be instantaneously shut down.

In a system using a separate cut-off device provided as an attached component part at the outlet of a conventional container valve, the mounting and fixing of the separate cut-off device to the surrounding structure is more complicated than the system in which only a conventional valve is used, even if the device itself is simple and securely operable. The level of safety is correspondingly lowered and the cost is higher.

Further, most of those systems incorporating an antiearthquake gas cut-off mechanism into the gas container valve have not yet met all the objective conditions. For example, there is a system in which a tapered portion having a passage narrowed toward an outlet is provided in the gas passage between the gas container body and the closing/opening section of the valve and a movable ball is provided in the passage. When the gas flow rate is abnormally increased, the ball is abutted against the tapered portion to cut off the gas.

However, any such system using a gas cut-off ball is either without a safety valve or, even if a safety valve is present, is unstable and insecure in operation because the stationary position in normal operation of the ball is located in the gas passage on the side toward the gas container body from the branching point leading to the safety valve.

In particular, there is a danger of explosion with the system without a safety valve due to its inability to respond to an abnormally elevated gas pressure, for example, at the time of fire. Such a system lacks an indispensable element, a high-pressure gas container valve. In the system in which the normal stationary position of the ball is located toward the gas container body, the ball is drawn by suction toward the safety valve from the branching point when the safety valve is actuated, thereby closing the opening toward the safety valve and not allowing the normal operation of the safety valve. Even if the passage leading to the safety valve is widened compared to the conventional product in order to make it larger than the diameter of the ball, when the safety valve is actuated before the starting of an abnormal outflow of gas or when an abnormal gas outflow occurs in the state where the ball remains in a position toward the safety valve from the branching point as a result of the cylinder falling down with the safety valve facing down, it is impossible, only by the flow of the gas, to move the ball from that position toward the point for cutting off the abnormal outflow. There is thus a disadvantage with the system in that its purpose of cutting off the gas outflow cannot be achieved.

SUMMARY OF THE INVENTION

It is an object of the present invention to provide an LP gas container valve for meeting an emergency in natural disasters by having a system incorporated in the valve which solves the above-described problems, satisfies all the required conditions for a high-pressure gas container valve and, together with a safety valve, is capable of securely preventing such accidents as a fire or explosion which may occur at the time of a disaster such as an earthquake.

To solve the above-described problems, an LP gas container valve against disasters is provided in accordance with the present invention having, the container valve mounted on a propane gas container and including a closing valve for opening and closing a gas passage leading to a valve outlet and a safety valve to be actuated in response to an abnormal elevation of gas pressure. The LP gas container valve comprises a ball having a stationary position in the normal state of operation and a gas cutting off position in the abnormal state of operation within the gas passage from the gas container to the container valve outlet between a branching point leading to the safety valve and the closing valve in which the ball is movable between the stationary position and the gas cutting off position. A tapered portion is provided in the gas passage in the vicinity of the gas cutting off position of the ball to narrow the passage toward the closing valve so that the ball abuts against the tapered portion to close the gas passage at the time of an abnormal outflow of gas from the gas container toward the container valve outlet.

Further, the LP gas container valve is constructed so that, in the state in which the closing valve is shut down, a terminal end of a seat packing of the closing valve abuts against the ball to form a gap between the tapered portion and the ball.

Furthermore, a ball receiver in the form of an umbrella frame having a lower center portion for receiving the ball and a raised portion toward the surrounding thereof is provided in the gas passage at the stationary position during the normal operation of the ball.

Moreover, the safety valve is disposed so that a traveling distance of 4 mm or more is provided between the stationary position of the ball in normal operation and the gas cutting off position of the ball in abnormal operation; the diameter of the ball is set at 8.17 mm to 10 mm and the minimum diameter of the tapered portion is set at 7.5 to 8 mm. The caliber of the gas passage continuing to the tapered portion is set at 13 mm or more.

DESCRIPTION OF THE PREFERRED EMBODIMENT

Figure 1:
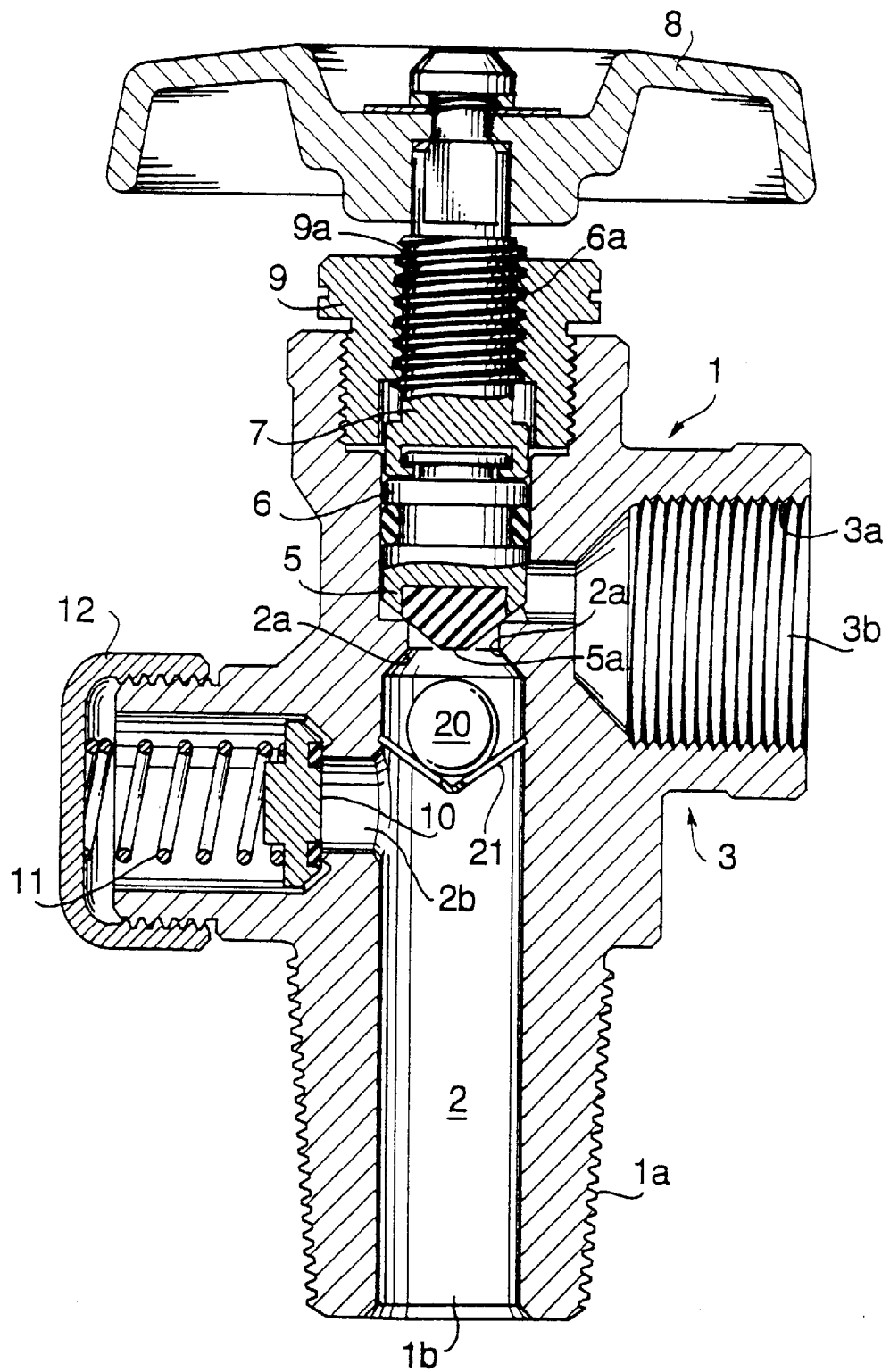
FIG. 1 is a front sectional view showing an embodiment of the present invention.
Figure 2:
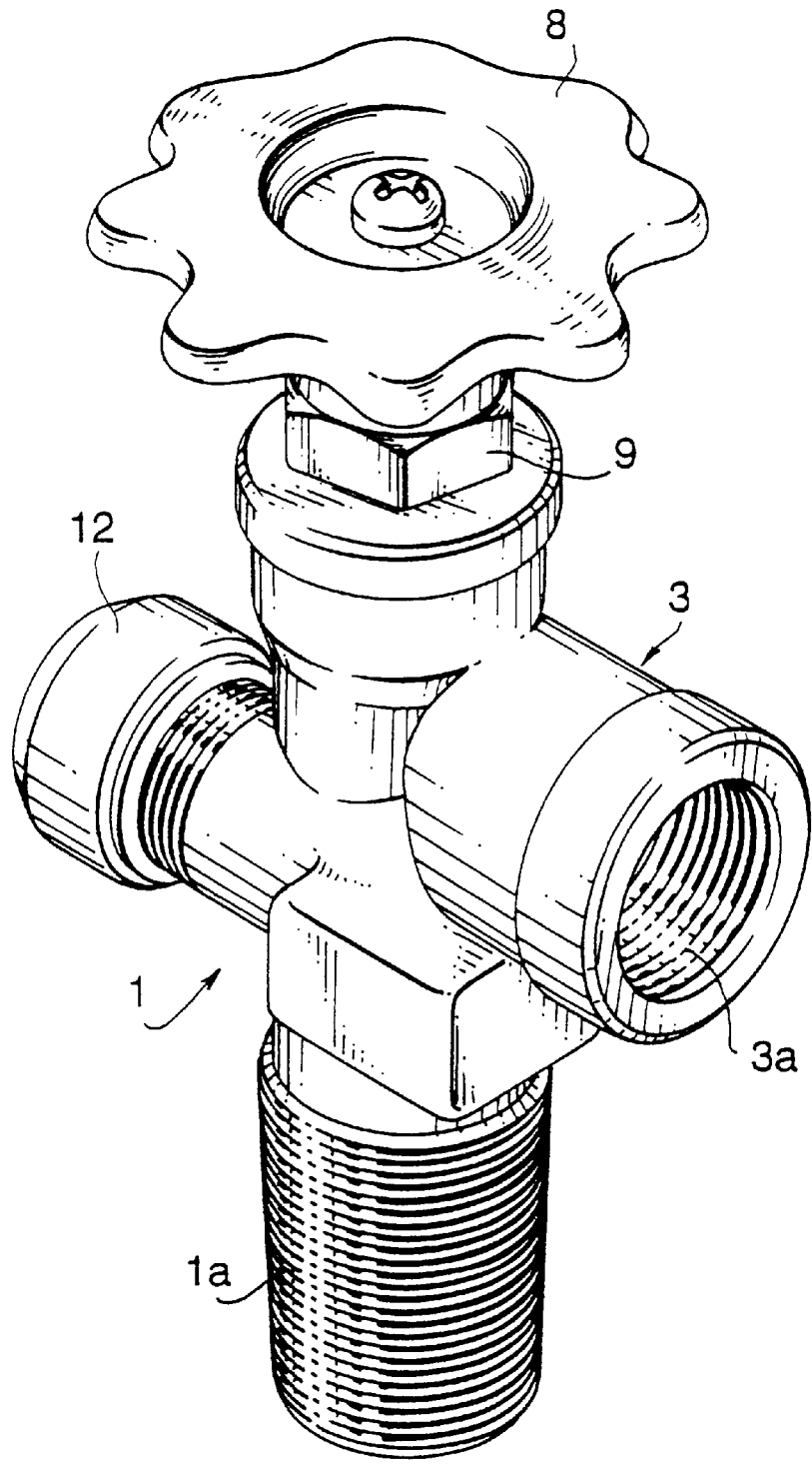
FIG. 2 is a view of the external appearance of the embodiment of FIG. 1.
Figure 3:
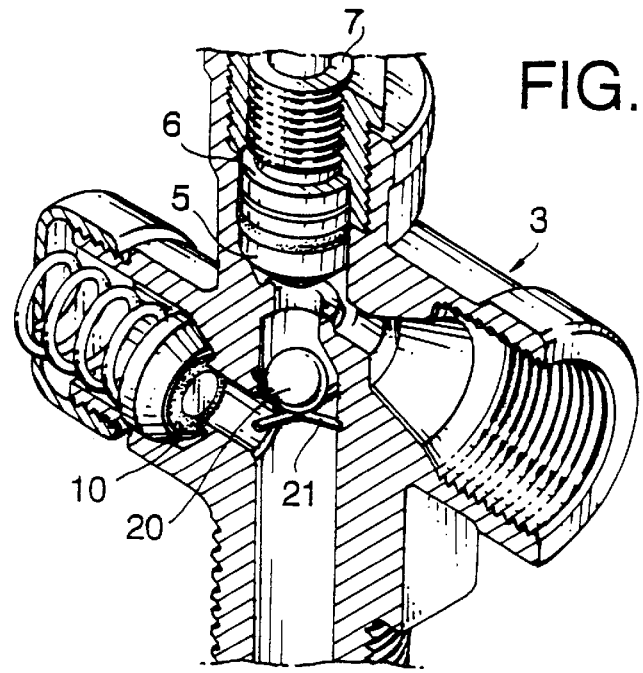
FIG. 3 is a view showing the embodiment of FIG. 2 with a portion thereof being removed.

An embodiment of the present invention will now be described in detail with reference to the drawings. FIG. 1 is a front sectional view showing an embodiment of the present invention. FIG. 2 is a view showing an external embodiment of FIG. 1. FIG. 3 is a view showing in section only certain portions of the external appearance of FIG. 2. Here, FIG. 1 shows a closing valve 5 in its closed position and FIG. 3 shows the closing valve 5 in its opened position.

Referring to FIGS. 1 and 3, a valve body 1 is screwed into a female thread in a gas outlet/inlet of a cylinder (not shown) to be coupled thereto by means of a gas cylinder coupling male screw 1a. Numeral 2 denotes a gas passage from a valve inlet 1b to a valve outlet 3b. A high-pressure pipe connecting portion 3 is coupled to a gas supplying high-pressure pipe (not shown) through a female screw 3a. It should be noted that, in most cases, coupling to a high-pressure pipe is performed by screwing a left-handed screw using an attaching metal fixture by means of a high-pressure hose.

Numeral 5 denotes a closing valve for shutting down the gas passage 2. The closing valve 5 may be moved up and down by a handle 8 which is coupled thereto through a valve stem 6 and a spindle 7. A gland nut 9 has a female screw portion 9a engaged with a male screw 6a of the valve stem 6. A safety valve 10 is pressed against an inclined surface 2a provided in a gas passage branch portion 2b leading to the safety valve by a spring 11 which is in contact with an inner side surface of a cap 12 at one end portion of the spring 11, thereby closing the gas passage branch portion 2b.

Since operation of the closing valve 5 and the safety valve 10 are identical to the operation of like portions of a conventional valve, the relation between the two will not be described.

Although, as shown in FIG. 2, the present embodiment has little difference in external appearance from a conventional gas cylinder valve, it has a ball (hereinafter referred to as stop ball) 20 for cutting off the gas at the time of an abnormal outflow of gas by abutting against the inclined surface 2a which narrows the gas passage immediately before the closing valve 5 is inserted into the gas passage 2 as shown in FIGS. 1 and 3.

A ball receiver 21 is provided to support the stop ball 20 in its normal position. The fixed position of the stop ball 20 is located as shown in FIGS. 1 and 3 toward the closing valve 5 from the branching point leading to the safety valve 10 within the gas passage 2.

Although the ball receiver 21 can have any shape, since a relatively large area for allowing passage of gas is provided and the resistance at the time of passing the gas is small, it is, in the present embodiment, similar to the frame of an umbrella opened upside down. The ball receiver 21 is formed into a cross having a lowered center portion and raised toward the surrounding portion.

It should be noted that, in order to fully utilize the function of the stop ball 20, the dimension from the terminal end of the seat packing of the closing valves to the center line of the safety valve 10 is selected to be 13 mm to 16 mm. In the present embodiment, the disposed position of the safety valve 10 is lowered by about 10 mm compared to a similar conventional product.

By disposing the safety valve 10 at this position, the distance between the closing valve 5 and the safety valve 10 is minimized to an extent possible to achieve a reduction in the size of the valve body, and a minimum (4 mm or more) distance is secured between the stationary position in normal operation and the gas cutting off position in abnormal operation of the stop ball 20 so as to secure the cutting off of the gas passage 2 by the stop ball 20.

Further, the diameter of the safety valve 10 is increased compared to the conventional product. It is about 10 mm in the present embodiment while it has been about 6.7 mm in the conventional product. Accordingly, since the opening area of the safety valve 10 is increased to about two times that of the conventional product, the safety level against a container explosion at the time of a disaster is much higher than that of the conventional product.

Figure 4:
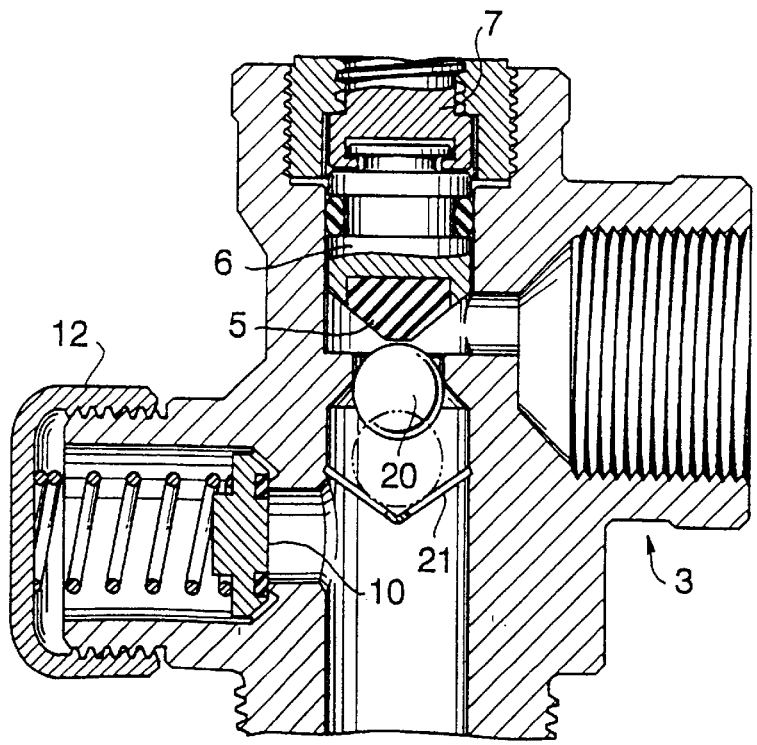
FIG. 4 illustrates operation (at the time of abnormal gas outflow) of the stop ball.

FIG. 4 illustrates certain portions around the stop ball 20, where the position in normal operation of the stop ball 20 is indicated by a two-dot chain line and its position when actuated is indicated by a solid line. The stop ball 20 may be designed so that, when the closing valve is opened as shown in FIG. 1, the stop ball 20 does not float when the gas flow is 4.5 kg/H or less but does float when the gas flow is 5 to 10 kg/H to close the gas passage 2.

It should be noted that, in the case of automatically switching between two LP gas cylinders for the general consumer, the gas flow at the time of using a single 50-kg container is normally 2 to 3 kg/H or less, even for equipment consuming a large amount; it is 4 kg/H or less during maximum use in a short period of time. In the case of the present embodiment, when the gas flow has become 8 kg/H or higher, the stop ball 20 is floated as a result of the gas pressure so as to automatically close the gas passage 2 as shown in FIG. 4 to stop the gas flow.

For restoration of the stop ball 20, which has once been actuated, it suffices to close the closing valve 5. By gradually closing the closing valve 5 after removing the cause of abnormal outflow of gas or confirming a safe environment even with an abnormal outflow, a terminal end portion 5a of the closing valve 5 contacts and pushes down the stop ball 20 to open the gas passage 2 which has been shut down. When the closing valve 5 is completely closed, the state shown in FIG. 1 is restored.

Figure 5:
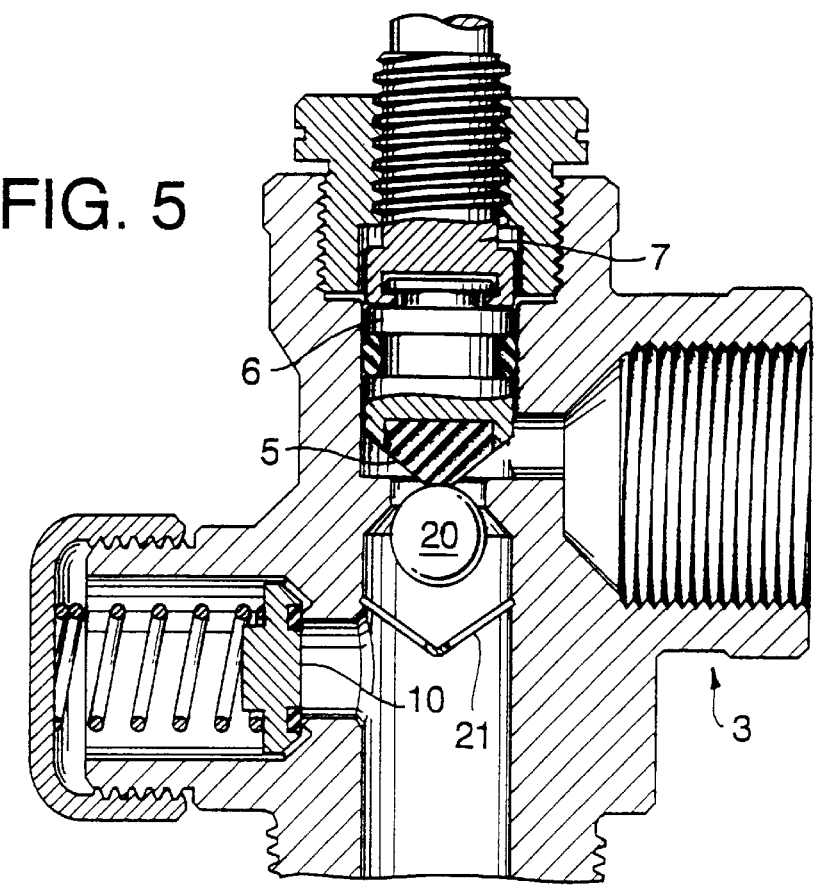
FIG. 5 illustrates operation (at the time of residual gas recovery) of the stop ball.

Further, while a blow and residual gas recovery operation is usually performed in an LP gas charging facility and a container inspection facility, it suffices in that case to bring the closing valve 5 to its half-opened state. FIG. 5 illustrates certain portions showing the half-opened state of the closing valve 5. Even if a significant amount of gas is discharged in a short time period in a blow and residual gas recovery operation, the stop ball 20 does not close the gas passage 2 due to the interference by the terminal end portion 5a of the closing valve 5 which is half-opened. Accordingly, the blow or residual gas recovery operation can be complete almost at the rate of a fully opened valve.

The reason for setting the stationary position in normal operation of the stop ball 20 to a position toward the closing valve 5 from the branching point leading to the safety valve 10 in the gas passage 2 is as follows.

Figure 6:
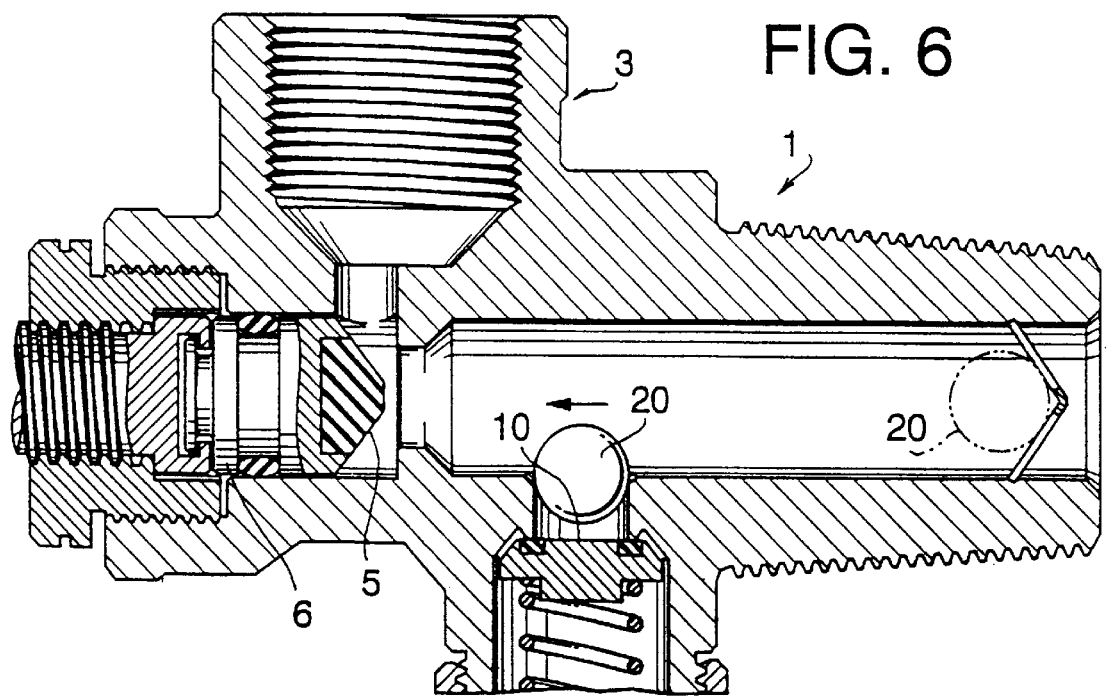
FIG. 6 illustrates an inoperable state due to an erroneous setting of the normal position of the stop ball.

The case is now considered in which the stationary position in normal operation of the stop ball 20 is provided, as shown in FIG. 6 toward the inlet 1a at the cylinder coupling portion. There is a possibility which cannot be ignored that the stop ball 20 will close the safety valve 10 or be in a position in relation to the safety valve 10 for some reason, such as an activation of the safety valve 10 before the occurrence of an abnormal outflow of gas or the cylinder falling down with the safety valve 10 facing down as shown in FIG. 6.

If the stop ball 20 completely closes the branch passage to the safety valve 10, the safety valve 10 is of no use at all. Further, if an abnormal outflow of gas occurs in the state where the stop ball 20 remains in such a position in relation to the safety valve 10, only the main stream of gas passes through the center portion of the gas passage 2, and it is impossible to cause the stop ball to move from the position, as shown in FIG. 6. Accordingly, the possible problem of being unable to cut off an abnormal outflow of gas occurs. The problem is completely eliminated by setting the stationary position in normal operation of the stop ball 20 in the gas passage 2 toward the side of the closing valve 5 from the branching point leading to the safety valve 10.

As has been described in detail above, according to the present invention: a ball hall, including a stationary position in normal state of operation and a gas cutting off position in abnormal state of operation is provided between the branching point leading to a safety valve and the closing valve within a gas passage extended from a gas container to a container valve outlet; a ball movable within the ball hall is provided; a tapered portion narrowing the passage toward the closing valve is provided in the gas passage in the vicinity of the gas cutting off position such that the ball abuts against the tapered portion to close the gas passage when an abnormal gas outflow occurs from the gas container toward the container valve outlet. An advantage is thereby achieved that it is possible to incorporate into the valve a system capable of preventing a fire or such accident as an explosion, which may occur at the time of disasters, such as earthquakes.

Accordingly, while an LP gas container provide at the place of a consumer has conventionally presented a continuous danger because it is used in the state in which the valve of the container is fully opened, such problem can be simply and totally eliminated by using the container valve of the present invention.

Further, based on the construction in which the terminal end of the seat packing of the closing valve abuts against the ball when the closing valve is closed so as to form a gap between the tapered portion and the ball, there is an advantage that a blow test, as well as a gas charging operation and residual gas recovery operation, are efficiently carried out, which are necessarily performed at an LP gas charging facility and container inspection facility, and which are considered necessary procedures by those skilled in the art.

What is claimed is:

1. An LP gas container valve assembly for mounting on a propane gas container, comprising:

a valve body having a valve outlet and a gas passage leading to the valve outlet from an inlet connection to a propane gas container;

a closing valve attached to the valve body, said closing valve opening and closing the gas passage;

a safety valve attached to the valve body, said safety valve being actuated in response to an excessive elevation in gas pressure;

a branching point in the gas passage, said branching point leading to the safety valve;

a ball located in the gas passage between the branching point and the closing valve, said ball having a stationary position in a normal state of operation and a gas cutting off position in response to an excessive elevation in gas pressure, said ball being movable between the stationary position and the gas cutting off position;

a tapered portion of the gas passage in the vicinity of the gas cutting off position of the ball to narrow the gas passage adjacent to the closing valve, said ball abutting against said tapered portion to close the gas passage in response to an excessive outflow of gas from the gas container toward the valve outlet; and a terminal end portion of the closing valve, said terminal end portion being adjustable to a half open position to prevent the ball from completely closing the gas passage.

2. An LP gas container valve assembly according to claim 1, wherein the closing valve has a seat packing with a terminal end and the terminal end of the seat packing abuts against the ball to form a gap between the tapered portion and the ball when the closing valve is shut down.

3. An LP gas container valve assembly according to claim 2, wherein a ball receiver in the form of an umbrella frame having a lower center portion for receiving the ball and a raised portion toward the surrounding thereof is provided in the gas passage at the stationary position in normal operation of the ball.

4. An LP gas container valve assembly according to claim 2, wherein the safety valve has a center line and the distance from the terminal end of the seat packing of the closing valve to the center line of the safety valve is 13 mm to 16 mm.

5. An LP gas container valve assembly according to claim 1 wherein a ball receiver in the form of an umbrella frame having a lower center portion for receiving the ball and a raised portion toward the surrounding thereof is provided in the gas passage at the stationary position in normal operation of the ball.

6. An LP gas container valve assembly according to claim 1, wherein the safety valve is disposed so as to provide a traveling distance of 4 mm or more between the stationary position in normal operation and the gas cutting off position in abnormal operation of the ball.

7. An LP gas container valve assembly according to claim 1, wherein the diameter of the ball is 8.17 mm to 10 mm, the minimum diameter of the tapered portion is 7.5 to 8 mm, and the caliber of the gas passage continuing to the tapered portion is 13 mm or more.

8. An LP gas container valve assembly according to claim 1, wherein the safety valve has a diameter of about 10 mm.

9. An LP gas container valve assembly according to claim 1, wherein the ball does not move from the stationary position when the gas flow in the gas passage does not exceed 4.5 kg/H.

10. An LP gas container valve assembly according to claim 1, wherein the ball moves from the stationary position when the gas flow in the gas passage is 5 to 10 kg/H.

11. An LP gas container valve assembly according to claim 1, wherein the ball is restored to the stationary position by closing the closing valve.

* * * * *